C. JOHNSON.
LUMBER GUIDE FOR RIP SAWS.
APPLICATION FILED NOV. 17, 1909.
983,723.
Patented Feb. 7, 1911.
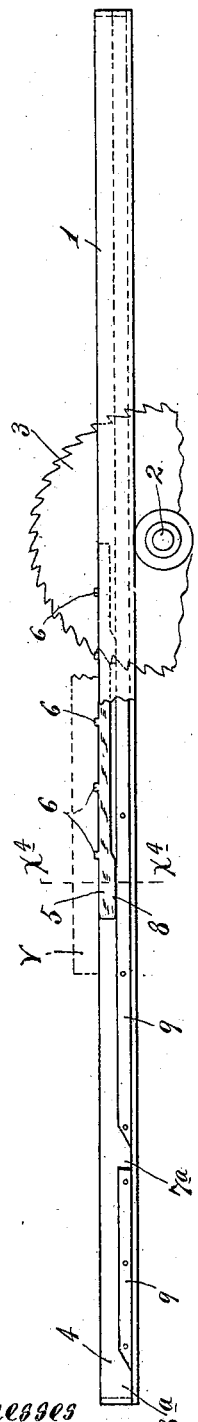
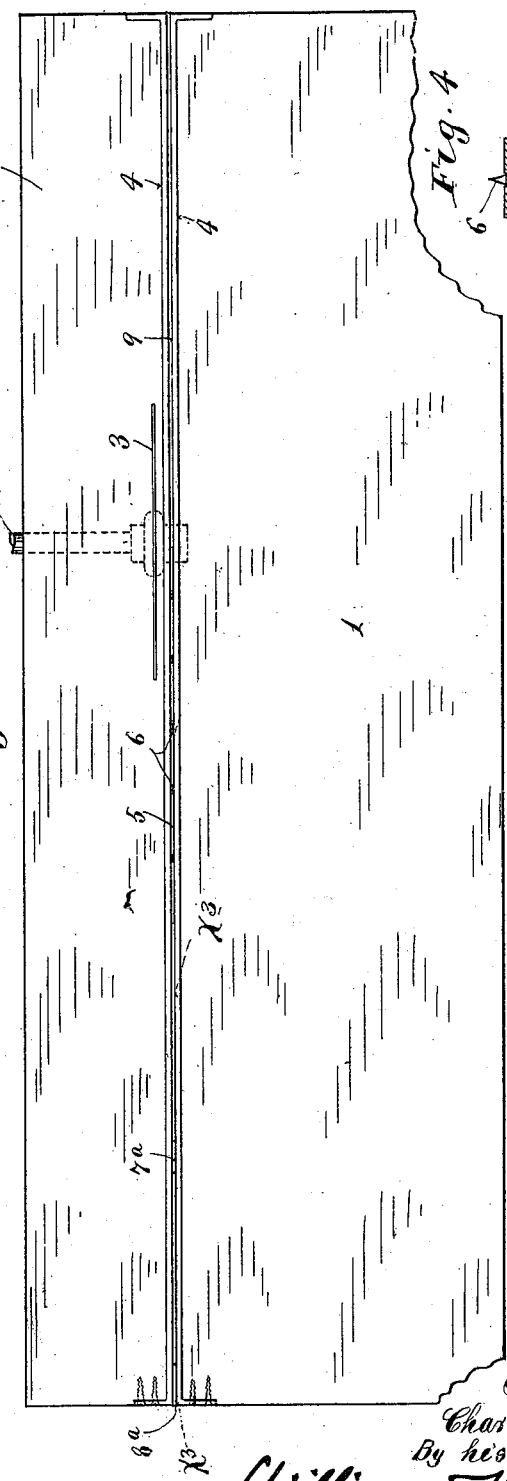
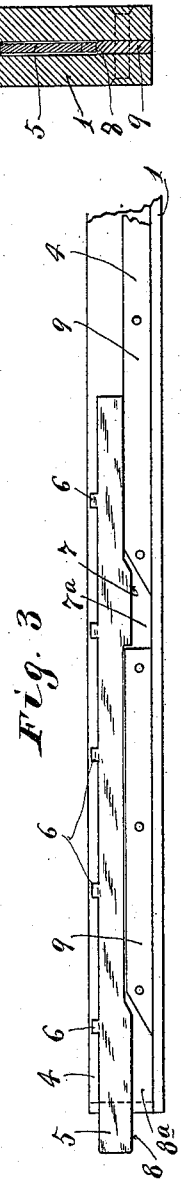
Witnesses
A. H. Opsahl
L. L. Simpson
Inventor
Charles Johnson
By his Attorneys
Williamson & Merchant
THE NORRIS PETERS CO., WASHINGTON, D. C.

UNITED STATES PATENT OFFICE.

CHARLES JOHNSON, OF MINNEAPOLIS, MINNESOTA.

LUMBER-GUIDE FOR RIP-SAWS.

983,723. Specification of Letters Patent. Patented Feb. 7, 1911.

Application filed November 17, 1909. Serial No. 528,451.

*To all whom it may concern:*

Be it known that I, CHARLES JOHNSON, a citizen of the United States, residing at Minneapolis, in the county of Hennepin and State of Minnesota, have invented certain new and useful Improvements in Lumber-Guides for Rip-Saws; and I do hereby declare the following to be a full, clear, and exact description of the invention, such as will enable others skilled in the art to which it appertains to make and use the same.

My invention has for its object to provide an extremely simple and highly efficient lumber guide, especially adapted for use in connection with the rip saws of box lumber machines and, to this end, it consists of the novel devices and combinations of devices hereinafter described and defined in the claims.

In sawing boards or lumber for use in making boxes and for other purposes, it is frequently necessary to move a board or a piece of lumber to and past the saw, in order to obtain the first straight edge thereon, and hithereto it has been the custom to perform this operation by hand. This hand operation of moving and guiding the board requires considerable care and even then it is practically impossible, by this hand operation, to saw the board with a perfectly straight edge.

My invention provides a very simple device by the use of which the board or piece of lumber may be guided with a perfectly true straight movement past the rip saw, thus making it an easy matter to saw the board with a perfectly straight edge.

In the accompanying drawings which illustrate the invention in its preferred form, like characters indicate like parts throughout the several views.

Referring to the drawings, Figure 1 is a plan view, showing the work table and rip saw of a box lumber machine and showing my improved guide applied to the said table; Fig. 2 is a side elevation of the parts shown in Fig. 1, with some portions broken away; Fig. 3 is a detail in vertical section, taken approximately on the line $x^3$ $x^3$ of Fig. 1, showing the parts on a larger scale than in Figs. 1 and 2; and Fig. 4 is a transverse section taken on the line $x^4$ $x^4$ of Fig. 2.

The work table of the machine is indicated by the numeral 1 and the rip saw, which is carried by the saw shaft 2, is indicated by the numeral 3. Set into a longitudinal groove in the table 1 is a pair of closely positioned but laterally spaced metal bars 4 rigidly secured to the table by screws or other suitable devices and extend in a horizontal direction parallel to the vertical cutting plane of the saw 3. The bars 4 constitute a runway, in which works a lumber guide formed by a thin metal bar 5 provided on its upper edge with upwardly projecting barbs or teeth 6 and on its under edge with depending front and rear cam lugs 7 and 8, respectively. Normally, the lower edge of the guide bar 5 rests upon a thin metal spacing strip 9 riveted or otherwise rigidly secured between the lower portions of the two bars 4. This bar 9 is provided with front and rear depressions or seats $7^a$ and $8^a$, respectively, in which, normally, the cam lugs 7 and 8 of the guide bar 5 are seated, as shown in Fig. 3, so that the teeth 6 of the said bar 5 are normally below the upper edges of the bars 4 and, hence, below the upper face of the table 1. Thus it will be seen that normally, and as shown in Fig. 3, the guide bar 5 occupies an inoperative position, so that the lumber or boards may be fed to the saw over the top of the table in the usual or any suitable way. It will also be noted that when the guide bar is in its normal position, its outer end projects somewhat beyond the receiving end of the table. Hence, when it is desired to use the guide bar, by pressing inward on the projecting end thereof, the inclined edges of the cam lugs 7 and 8 will be forced up the inclined edges of the seats $7^a$ and $8^a$, so that the said cam lugs will be forced to the upper edge of the supporting strip 9, thereby throwing the teeth 6 of the said bar above the upper surface of the table where they will engage a board or piece of lumber Y which is to be fed to the saw. When the board is thus engaged with the teeth of the guide bar, it will be positively held against lateral movements but may be freely moved to and past the saw, under which movement said guide bar 5 will travel in its runway with the engaged board. It is here important to note that the cam lug 7 is shorter than the cam lug 8 and that the seat $7^a$ is shorter than the said cam lug $8^a$, so that under forward and rearward movements of the guide bar 5, the said cam lug $8^a$ will pass over the said seat $7^a$. The two guide lugs, therefore, support the guide bar in its raised position at all times, except when the lugs 7 and 8 are engaged, respectively, with the seats 7a and 8a.

Obviously, a board or piece of lumber guided by the guide bar, as above described, will be held for perfectly true straight line movement past the saw, so that the board will be sawed with a perfectly straight edge. The guide bar, when raised and engaged by the board, may be freely moved backward and forward by the engaged board and the edge ripped from the board will not disturb the engagement between the said board and guide. The guide bar, therefore, need be engaged by the hand only when it is given its initial movement required to throw the same into an operative position with its teeth above the upper surface of the table.

The device described may be applied to a box lumber sawing machine or to any other similar sawing machine at very small cost. The practicability of the device has been thoroughly demonstrated in practice and it has been found that it not only saves time but that it produces a much better grade of work and makes the sawing operation less dangerous than under the old manner of delivering the boards to the saw.

What I claim is:

1. The combination with a table and a saw, of a lumber guiding bar arranged to slide in a runway formed in said table, said guide bar and table having coöperating cam surfaces normally permitting the guide bar to lie in an inoperative position, but operating under initial endwise movement of said bar to raise the same into an operative position, and means on the guide bar engaging the work to cause it and the said bar to move together and to maintain a given alinement of the work and the guide bar, substantially as described.

2. The combination with a table and a saw, of a lumber guide bar arranged to slide in a runway formed in said table parallel to the cutting plane of the saw, said guide bar having teeth on its upper edge and the said runway and guide bar having cam surfaces and seats coöperating, normally to hold said bar in an inoperative position and to raise said bar with its teeth above the upper surface of said table, substantially as described.

3. The combination with a table and a saw, of a guide bar having teeth on its upper edge and front and rear cam lugs on its lower edge, and a runway for said guide bar located in said table, extended parallel to the cutting plane of said saw and provided in its bottom with cam lug seats normally permitting said guide bar to occupy an inoperative position but coöperating with said cam lugs to force said guide bar into an operative position with its teeth above the upper edge of said table, when the said bar is given an initial endwise movement, the front lug seat of said runway being longer than the rear cam lug of said guide bar, so that the latter will pass over the same, substantially as described.

In testimony whereof I affix my signature in presence of two witnesses.

CHARLES JOHNSON.

Witnesses:
ALICE V. SWANSON,
HARRY D. KILGORE.